US012580295B2

(12) United States Patent
Hatamian et al.

(10) Patent No.: US 12,580,295 B2
(45) Date of Patent: Mar. 17, 2026

(54) COMMUNICATION APPARATUS AND METHOD FOR ADAPTIVE COOLING OF ANTENNA ELEMENTS

(71) Applicant: PELTBEAM INC., Sherman Oaks, CA (US)

(72) Inventors: Mehdi Hatamian, Mission Viejo, CA (US); Venkat Kalkunte, Saratoga, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/198,315

(22) Filed: May 5, 2025

(65) Prior Publication Data

US 2025/0266602 A1     Aug. 21, 2025

Related U.S. Application Data

(63) Continuation of application No. 18/668,053, filed on May 17, 2024, now Pat. No. 12,322,854, which is a continuation of application No. 18/433,652, filed on Feb. 6, 2024, now Pat. No. 12,021,293, which is a continuation of application No. 18/363,090, filed on Aug. 1, 2023, now Pat. No. 11,936,093, which is a continuation of application No. 17/986,043, filed on Nov. 14, 2022, now Pat. No. 11,742,561, which is a
(Continued)

(51) Int. Cl.
*H01Q 1/02* (2006.01)
*H01Q 1/22* (2006.01)
*G01J 5/12* (2006.01)

(52) U.S. Cl.
CPC ............. *H01Q 1/02* (2013.01); *H01Q 1/2283* (2013.01); *G01J 5/12* (2013.01); *G01J 2005/123* (2013.01)

(58) Field of Classification Search
CPC .............................. H01Q 1/02; H01Q 1/2283
See application file for complete search history.

(56) References Cited

U.S. PATENT DOCUMENTS 5,583,507 A     12/1996   D'Isepo et al.
6,441,368 B1     8/2002   Grinberg et al.
(Continued)

FOREIGN PATENT DOCUMENTS

EP            2362490 A1      8/2011
KR       20190119943 A      10/2019

OTHER PUBLICATIONS

Non-Final Office Action for U.S. Appl. No. 17/986,043 dated Jan. 3, 2023.
(Continued)

*Primary Examiner* — Graham P Smith
(74) *Attorney, Agent, or Firm* — CHIP LAW GROUP

(57) ABSTRACT

A communication apparatus that includes a first antenna array including a first plurality of antenna elements mounted at a first location on a vehicle, a first plurality of thermoelectric devices arranged on the first plurality of antenna elements such that each thermoelectric device covers a different subset of antenna elements, and a processor coupled to the first antenna array and the first plurality of thermoelectric devices. The processor determines a visibility status of the first antenna array to a network node based on a motion of the vehicle, activates or deactivates the first antenna array based on the visibility status, and controls each of the first plurality of thermoelectric devices based on the activation or deactivation of the first antenna array.

20 Claims, 5 Drawing Sheets

Related U.S. Application Data continuation of application No. 17/453,477, filed on Nov. 3, 2021, now Pat. No. 11,527,809, which is a continuation of application No. 17/321,976, filed on May 17, 2021, now Pat. No. 11,211,682.

(56) References Cited

U.S. PATENT DOCUMENTS

| | | | |
|---|---|---|---|
| 6,507,312 | B1 | 1/2003 | Fredericks et al. |
| 6,765,535 | B1 | 7/2004 | Brown et al. |
| 7,372,424 | B2 | 5/2008 | Mohuchy et al. |
| 8,450,895 | B1 | 5/2013 | Howard |
| 10,775,529 | B2 | 9/2020 | Ammar |
| 11,211,682 | B1 | 12/2021 | Hatamian et al. |
| 11,268,837 | B1 | 3/2022 | Cohen et al. |
| 2003/0080899 | A1 | 5/2003 | Lee et al. |
| 2004/0196193 | A1 | 10/2004 | Brown et al. |
| 2005/0200533 | A1 | 9/2005 | Brown et al. |
| 2008/0062066 | A1 | 3/2008 | Arai |
| 2011/0260800 | A1 | 10/2011 | Shanfield et al. |
| 2013/0082345 | A1 | 4/2013 | Corcos et al. |
| 2013/0146772 | A1 | 6/2013 | N'Guyen et al. |
| 2014/0111364 | A1 | 4/2014 | Sjolund |
| 2014/0125506 | A1 | 5/2014 | Sjolund |
| 2016/0135019 | A1 | 5/2016 | Cavallaro et al. |
| 2017/0170542 | A1 | 6/2017 | Lei et al. |
| 2018/0040820 | A1 | 2/2018 | Mann et al. |
| 2019/0148820 | A1 | 5/2019 | Biedscheid et al. |
| 2020/0021022 | A1 | 1/2020 | Awaji |
| 2020/0244109 | A1 | 7/2020 | Song et al. |
| 2021/0039007 | A1 | 2/2021 | Hatamian |
| 2021/0256187 | A1 | 8/2021 | Prystupa et al. |
| 2021/0354859 | A1 | 11/2021 | Aston et al. |
| 2021/0381900 | A1 | 12/2021 | Carr |
| 2022/0077561 | A1 | 3/2022 | Pfletschinger et al. |
| 2022/0271825 | A1 | 8/2022 | Pace et al. |

OTHER PUBLICATIONS

Non-Final Office Action for U.S. Appl. No. 18/363,090 dated Oct. 24, 2023.

Non-Final Office Action for U.S. Appl. No. 18/668,053 dated Sep. 9, 2024.

Non-Final Office Action in U.S. Appl. No. 17/321,976 dated Sep. 10, 2021.

Non-Final Office Action in U.S. Appl. No. 17/453,477 dated Apr. 6, 2022.

Notice of Allowance for U.S. Appl. No. 17/986,043 dated Apr. 14, 2023.

Notice of Allowance for U.S. Appl. No. 18/363,090 dated Dec. 14, 2023.

Notice of Allowance for U.S. Appl. No. 18/433,652 dated Apr. 2, 2024.

Notice of Allowance in U.S. Appl. No. 17/321,976 dated Oct. 25, 2021.

Non-Final Office Action for U.S. Appl. No. 19/198,197, dated Jun. 25, 2025.

400

Determine operational state of first plurality of antenna elements 402

Determine which antenna elements of first plurality of antenna elements are in activated state and which are in deactivated state 402A Determine performance state of first plurality of antenna elements of first antenna array 402B Obtain traffic information of geographical area surrounding deployed location of communication apparatus 402C Proactively predict operational state of first plurality of antenna elements based on obtained traffic information 402D Obtain in real time or near real time one or more of: weather condition, position information of one or more UEs to be served by first antenna array, a 2D or 3D position information of communication apparatus 402E Proactively predict operational state of first plurality of antenna elements based on obtained weather condition, position information of one or more UEs to be served by first antenna array, and 2D or 3D position information of communication apparatus 402F

A

Control each of first plurality of thermoelectric devices based on determined operational state of first plurality of antenna elements such that an adaptive cooling is applied on different subsets of antenna elements of first plurality of antenna elements to maintain temperature of first plurality of antenna elements in specified temperature range 404

Executing activation or deactivation of each of first plurality of thermoelectric devices in synchronization with activated state or deactivated state of different subsets of antenna elements of first plurality of antenna elements 404A Changing voltage input to cause corresponding change in temperature output from each of first plurality of thermoelectric devices such that adaptive cooling is applied on different subsets of antenna elements of first plurality of antenna elements 404B Substantially equalizing temperature associated with first plurality of antenna elements such that performance state of first plurality of antenna elements of first antenna array is substantially equalized 404C Increase or decrease cooling from each of first plurality of thermoelectric devices based on obtained traffic information that indicates a number of UEs to be served in the geographical area 404D Increase or decrease cooling from each of first plurality of thermoelectric devices based on one or more of: obtained weather condition, position information of one or more UEs to be served by first antenna array, and 2D or 3D position information of communication apparatus 404E

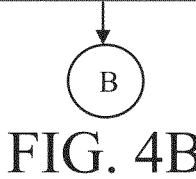

Determine operational state of second plurality of antenna elements 406

Control each of second plurality of thermoelectric devices based on determined operational state of first plurality of antenna elements as well as second plurality of antenna elements 408

COMMUNICATION APPARATUS AND METHOD FOR ADAPTIVE COOLING OF ANTENNA ELEMENTS

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 18/668,053 filed on May 17, 2024, which is a Continuation Application of U.S. patent Ser. No. 18/433,652 filed on Feb. 6, 2024, which is a Continuation Application of U.S. Pat. No. 11,936,093, granted on Mar. 19, 2024, which is a Continuation Application of U.S. Pat. No. 11,742,561, granted on Aug. 29, 2023, which is a Continuation Application of U.S. Pat. No. 11,527,809, granted on Dec. 13, 2022, which is a Continuation Application of U.S. Pat. No. 11,211,682, granted on Dec. 28, 2021. Each of the above-referenced applications is hereby incorporated herein by reference in its entirety.

FIELD OF TECHNOLOGY

Certain embodiments of the disclosure relate to a communication apparatus. More specifically, certain embodiments of the disclosure relate to a communication apparatus and method for adaptive cooling of antenna elements.

BACKGROUND

Wireless telecommunication in modern times has witnessed advent of various signal transmission techniques and methods, such as use of beam forming and beam steering techniques, for enhancing capacity of radio channels. In accordance with such techniques, when in operation, an antenna array radiates or receives radio waves in form of beams of radio frequency (RF) signals, which generates significant amount of heat in underlying electronic components. For example, circuits and chips of the antenna array generate significant amount of heat that needs to be removed to keep the circuits and chips at a desired operating temperature range for consistent performance and for avoiding loss of gain due to high temperatures. As electronic components have become faster and more powerful, thermal management in a conventional communication apparatuses and systems, has become a technically challenging issue. For example, for millimeter wave communication capable apparatus, thermal management is a prominent technical challenge for desired performance. Moreover, communication apparatuses, such as a repeater device, a small cell, etc., are mostly deployed outdoors, and thus are subjected to extreme heat, which further aggravates the problem of heating. The conventional approach of using heatsinks and/ or fans for cooling such communication systems may result in bulky modules and increase the maintenance cost in the long run, which is not desirable.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication apparatus and method for adaptive cooling of antenna elements, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 4A, 4B, and 4C collectively, is a flowchart that illustrate a method for adaptive cooling of antenna elements, in accordance with an embodiment of the disclosure.

DETAILED DESCRIPTION OF THE DISCLOSURE

Certain embodiments of the disclosure may be found in a communication apparatus and method for adaptive cooling of antenna elements. The communication apparatus and method of the present disclosure not only improves performance of the communication apparatus by maintaining a temperature of the antenna arrays in the communication apparatus in a specified temperature range but also optimizes power consumption by providing a capability of adaptive cooling of antenna elements. The solution provided in the present disclosure reduces the overall maintenance cost of the communication apparatus and provides an intelligent and practical cooling mechanism to ensure operational reliability of the communication apparatus for consistent high-performance communication. In the following description, reference is made to the accompanying drawings, which form a part hereof, and in which is shown, by way of illustration, various embodiments of the present disclosure.

Figure 1:
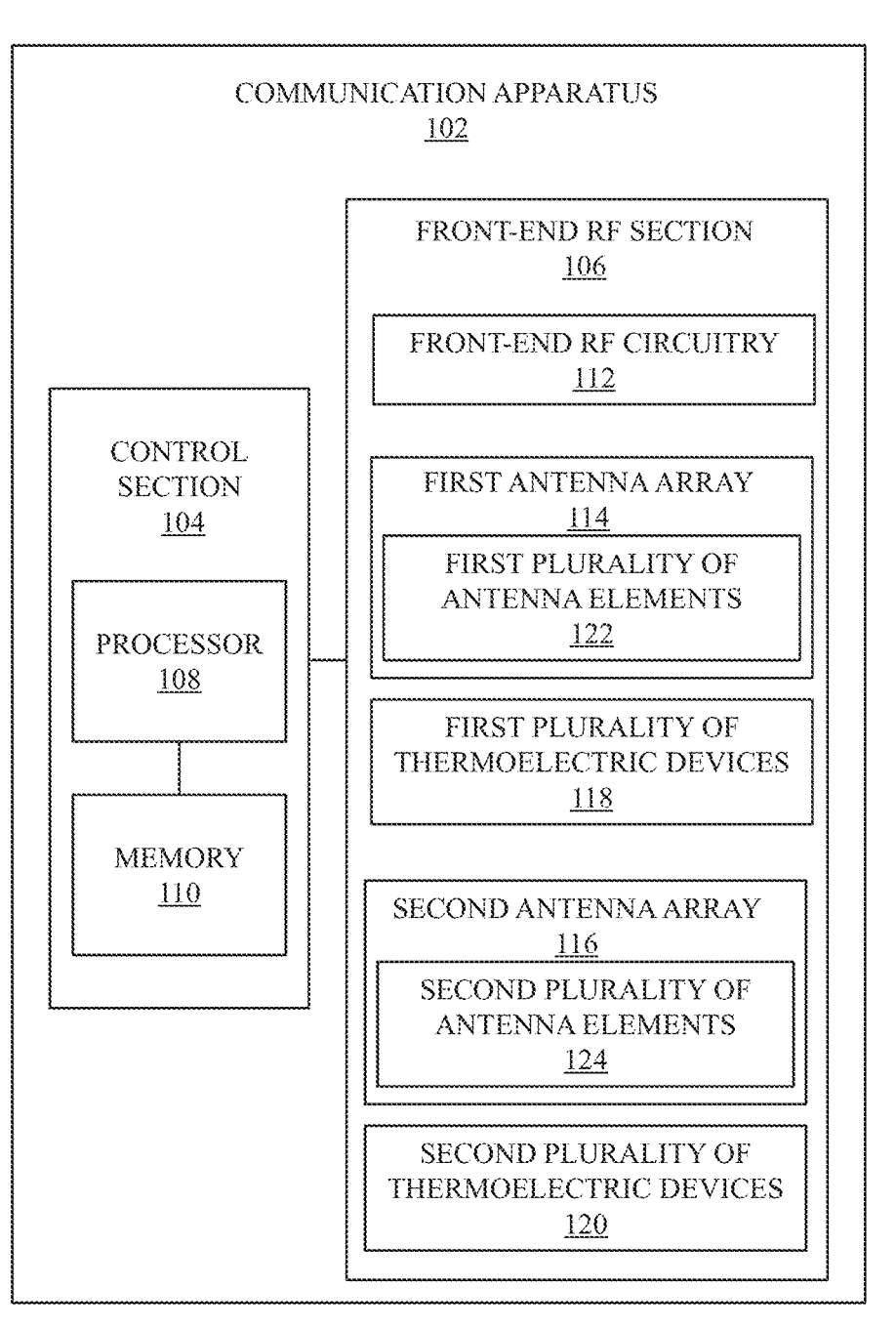
FIG. 1 is a block diagram illustrating various components of an exemplary communication apparatus, in accordance with an exemplary embodiment of the disclosure.

FIG. 1 is a block diagram illustrating various components of an exemplary communication apparatus, in accordance with an exemplary embodiment of the disclosure. With reference to FIG. 1, there is shown a block diagram 100 of a communication apparatus 102. The communication apparatus 102 may include a control section 104 and a front-end radio frequency (RF) section 106. The control section 104 may include a processor 108 and a memory 110. The control section 104 may be communicatively coupled to the front-end RF section 106. The front-end RF section 106 may include front-end RF circuitry 112, a plurality of antenna arrays, such as a first antenna array 114 and a second antenna array 116, and a plurality of thermoelectric devices, such as a first plurality of thermoelectric devices 118 and a second plurality of thermoelectric devices 120. The first antenna array 114 may include a first plurality of antenna elements 122 and the second antenna array 116 may include a second plurality of antenna elements 124.

The communication apparatus 102 includes suitable logic, circuitry, and interfaces that may be configured to communicate with one or more network nodes, such as one or more base stations and another repeater devices and user equipment (UEs). In accordance with an embodiment, the communication apparatus 102 may support multiple and a wide range of frequency spectrum, for example, 2G, 3G, 4G, 5G, and 6G (including out-of-band frequencies). The communication apparatus 102 is one of an XG-enabled repeater device, an XG-enabled small cell, or an XG-enabled customer premise equipment (CPE), where the term "XG" refers to 5G or 6G. Other examples of the communication apparatus 102 may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof.

The processor 108 may be communicatively coupled to the first antenna array 114 and the first plurality of thermo-electric devices 118. Similarly, the processor 108 may also be communicatively coupled to the second antenna array 116 and the second plurality of thermoelectric devices 120. The processor 108 may be configured to execute various operations of the communication apparatus 102. The processor 108 may be configured to control various components of the front-end RF section 106. The communication apparatus 102 may be a programmable device, where the processor 108 may execute instructions stored in the memory 110. Example of the implementation of the processor 108 may include, but are not limited to an embedded processor, a microcontroller, a specialized digital signal processor (DSP), a Reduced Instruction Set Computing (RISC) processor, an Application-Specific Integrated Circuit (ASIC) processor, a Complex Instruction Set Computing (CISC) processor, and/or other processors, or state machines.

The memory 110 may be configured store values, such as determined operational states of the first plurality of antenna elements and the second plurality of antenna elements of the first antenna array and the second antenna array, respectively. Examples of the implementation of the memory 110 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 104 may further include one or more other components, such as an analog to digital converter (ADC), a digital to analog (DAC) converter, a cellular modem, and the like, known in the art, which are omitted for brevity.

The front-end RF circuitry 112 includes receiver circuitry and transmitter circuitry. The receiver circuitry is coupled to the one or more receiving antenna arrays, such as one of the first antenna array 114 or the second antenna array 116 or may be a part of the receiver chain. The transmitter circuitry may be coupled to the one or more transmitting antenna arrays, such as the first antenna array 114 or the second antenna array 116 in an implementation. The front-end RF circuitry 112 supports millimeter wave (mmWave) communication as well communication at a sub 6 gigahertz (GHz) frequency.

Each of the first antenna array 114 and the second antenna array 116 may be one of an XG phased-array antenna panel, an XG-enabled antenna chipset, an XG-enabled patch antenna array, or an XG-enabled servo-driven antenna array, where the "XG" refers to 5G or 6G. The first antenna array 114 has a first side that represents an RF circuitry and chip side and a second side that represents a radiating side of the first plurality of antenna elements 122. Similarly, the second antenna array 116 has a first side that represents a RF circuitry and chip side and a second side that represents a radiating side of the second plurality of antenna elements 124.

The first plurality of thermoelectric devices 118 are arranged on the first plurality of antenna elements 122 of the first antenna array 114 such that each thermoelectric device covers a different subset of antenna elements of the first plurality of antenna elements 122. Similarly, the second plurality of thermoelectric devices 120 are arranged on the second plurality of antenna elements 124 of the second antenna array 116 such that each thermoelectric device covers a different subset of antenna elements of the second plurality of antenna elements 124. Each of the thermoelectric devices, such as the first plurality of thermoelectric devices 118 and the second plurality of thermoelectric devices 120, has a cooling side and a heat dissipation side, and two connection leads. The cooling side each of the first plurality of thermoelectric devices 118 is arranged on the first side (i.e., chip side) of the first antenna array 114. Similarly, the cooling side each of the second plurality of thermoelectric devices 120 is arranged on the first side (i.e., chip side) of the second antenna array 116. In an implementation, each of the first plurality of thermoelectric devices 118 and the second plurality of thermoelectric devices 120 may be a Peltier device. Each of the first plurality of thermoelectric devices 118 and the second plurality of thermoelectric devices 120 do not have any moving parts and circulating liquid, which further contributes to reducing the maintenance cost of the communication apparatus 102. Such thermoelectric devices manifest a very long life, invulnerability to leaks, and are scalable, lightweight, small in size and even flexible in shape. It is to be understood by one of ordinary skill in the art that other thermoelectric semiconductor devices or thermoelectric coolers may be used without limiting the scope of the disclosure.

In operation, the processor 108 may be configured to determine an operational state of the first plurality of antenna elements 122. The operational state indicates a power state or a performance state of the first plurality of antenna elements 122. The processor 108 may be communicatively coupled to the front-end RF section 106 and may detect the power state or the performance state of the first plurality of antenna elements 122 from the front-end RF circuitry 112.

In an implementation, when in operation, the processor 108 may be configured to partition the first plurality of antenna elements 122 into a plurality of subsets of antenna elements (i.e., a plurality of spatially separated antenna sub-arrays). The partition may be done dynamically and may be a logical partition. In one example, the first antenna array 114 may comprise 256 antenna elements and has 16 rows and 16 columns. Thus, each of the plurality of subsets of antenna elements may comprise 64 elements each. The first antenna array 114 may be configured to generate one or more beams of RF signals using the partitions. In another example, the first antenna array 114 includes a plurality of chips arranged to form the first plurality of antenna elements 122 (e.g., one or more subsets of four Tx/Rx chips and one mixer chip, where each Tx/Rx chip may include X-number of antenna elements).In such a case, each of the one or more subsets of four Tx/Rx chips and one mixer chip may correspond to one subset of the plurality of subsets of antenna elements. Moreover, the first plurality of thermoelectric devices 118 are arranged on the first plurality of antenna elements 122 of the first antenna array 114 such that each thermoelectric device covers a different subset of antenna elements of the first plurality of antenna elements 122. In one example, one thermoelectric device of the first plurality of thermoelectric devices 118 may cover four Tx/Rx chips and a mixer chip. In another example, one thermoelectric device of the first plurality of thermoelectric devices 118 may cover one chip individually. In yet another example, the distribution of the first plurality of thermoelectric devices 118 on the first plurality of antenna elements 122 may be based on an identification of one or more radiation surplus regions and radiation deficient regions in an antenna array. For example, in case of receiver antenna array, the central portion of the first antenna array 114 may be a radiation surplus region and other peripheral areas of the first antenna array 114 may be radiation deficient regions. Thus, in such cases, one or more thermoelectric devices may be arranged on the radiation surplus region, whereas either none or a comparatively less number of thermoelectric devices may be arranged on the radiation deficient regions.

In accordance with an embodiment, the distribution of the first plurality of thermoelectric devices 118 on the first plurality of antenna elements 122 may be based on a type of antenna array and its deployment preferences. For example, if the first antenna array 114 is to be used as a service side antenna array that faces a plurality of UEs, the number of first plurality of thermoelectric devices 118 used may be higher as compared to a case where the first antenna array 114 is a source side antenna array that faces one or more base stations. This is because if it is known that a location of communication apparatus 102 where it is to be deployed is fixed with respect to the base station, then it can be derived that there will be less changes in beamforming between the communication apparatus 102 and the one or more base stations resulting in less power consumption and heat generation, and in turn low cooling requirements on the source side antenna array. However, if the communication apparatus 102 is a repeater device installed on a moving object, such as a vehicle, then in such a case, the source side antenna array that faces one or more base stations may require continuous changes in beamforming patterns, resulting in heat generation by the underlying electronic components (e.g., circuitry and chips) of the first antenna array 114. Thus, in such cases, the number of first plurality of thermoelectric devices 118 on the first antenna array 114 designated as the source side antenna array may be higher and distribution may be dense based on expected exposure of the first plurality of antenna elements 122 to beams of RF signals of the first antenna array 114. On the contrary, the first antenna array 114 when arranged to face an interior of the vehicle, then either none or a comparatively less number of thermoelectric devices may be used to save power.

The processor 108 may be further configured to control each of the first plurality of thermoelectric devices 118 based on the determined operational state of the first plurality of antenna elements 122 such that an adaptive cooling is applied on different subsets of antenna elements of the first plurality of antenna elements 122 to maintain a temperature of the first plurality of antenna elements 122 in a specified temperature range. Not all the first plurality of antenna elements 122 may be operational at a given point in time, or more heating may be generated at some subsets of antenna elements as compared to other subsets of the first plurality of antenna elements 122. Thus, the information of the operational state of each of plurality of subsets of antenna elements may be leveraged to control, for example, activate corresponding thermoelectric devices of only such subsets of antenna elements that require comparatively more cooling. This results in an overall adaptive cooling system with an on-demand performance. When the chips and circuitry associated with such subsets of antenna elements that require comparatively more cooling, are subjected to cooling by use of corresponding thermoelectric devices arranged on such subsets of antenna elements, a desired operating temperature range is maintained, which results in improved (i.e., optimum) performance and avoids any potential loss of gain due to high temperatures.

In accordance with an embodiment, the determination of the operational state of the first plurality of antenna elements 122 may comprise determining which antenna elements of the first plurality of antenna elements 122 are in an activated state and which are in a deactivated state. In such a case, the control of each of the first plurality of thermoelectric devices 118 may comprise executing an activation or a deactivation of each of first plurality of thermoelectric devices 118 in synchronization with the activated state or deactivated state of the different subsets of antenna elements of the first plurality of antenna elements 122. In an example, a first thermoelectric device may cover a first subset of antenna elements, a second thermoelectric device may cover a second subset of antenna elements, a third thermoelectric device may cover a third subset of antenna elements, and a fourth thermoelectric device may cover a fourth subset of antenna elements of the first plurality of antenna elements 122. The coverage of the different subsets of antenna elements implies an arrangement where the cooling side of each thermoelectric device is placed on the corresponding subset of antenna elements such that when input voltage is supplied to a given thermoelectric device, a temperature difference is generated across the two sides of the given thermoelectric device. The cooling side of the given thermoelectric device passes the cooling to the circuitry and chips associated with the corresponding subset of antenna elements to maintain the temperature of the corresponding subset of antenna elements in the specified temperature range. The heat dissipation side of the given thermoelectric device dissipates the heat outside the communication apparatus. In some embodiments, for the heat dissipation, a modular heat sink may be employed, which may have a size that is less than a defined threshold size. In this case, for instance, the first subset of antenna elements and the second subset of antenna elements may be determined to be in the activated state, whereas the third and fourth subset of antenna elements may be determined to be in the deactivated state. In such a case, the processor 108 may be configured to activate the first thermoelectric device and the second thermoelectric device and voltage may be supplied to provide cooling to the first subset of antenna elements and the second subset of antenna elements, respectively. However, the third thermoelectric device and the fourth thermoelectric device may not be activated. In an implementation, the activation of the first thermoelectric device and the second thermoelectric device may be in a real-time or near real-time as soon as the first subset of antenna elements and the second subset of antenna elements starts its operation. In another implementation, the activation of the first thermoelectric device and the second thermoelectric device may be executed in a defined delayed time, for example, after a certain time has elapsed from the start of operation of the first subset of antenna elements and the second subset of antenna elements. The defined delayed time may be pre-set at the communication apparatus 102 or may be calculated dynamically.

In accordance with an embodiment, the communication apparatus 102 may comprise an array of temperature sensors to measure temperature of each chip (i.e. each antenna chip) of the plurality of chips of an antenna array, such as the first antenna array 114. Accordingly, the control of each of the first plurality of thermoelectric devices 118 may comprise changing a voltage input to cause a corresponding change in a temperature of the first plurality of thermoelectric devices 118 such that the adaptive cooling is applied on different subsets of antenna elements of the first plurality of antenna elements 122 based on the measured temperature from the array of temperature sensors.

In accordance with another embodiment, the array of temperature sensors may not be used, and the determination of the operational state of the first plurality of antenna elements 122 may comprise determining a performance state of the first plurality of antenna elements 122 of the first antenna array 114. In such a case, the control of each of the first plurality of thermoelectric devices 118 may comprise changing a voltage input to cause a corresponding change in a temperature of the first plurality of thermoelectric devices 118 such that the adaptive cooling is applied on different subsets of antenna elements of the first plurality of antenna elements 122. Based on experimentation, it is observed that when the temperature changes (e.g. high heat generated), the output power of an antenna, such as the first antenna array 114 also changes, and the overall performance of wireless communication by such antenna, such as the first antenna array 114, is affected. Thus, the performance state of the communication apparatus 102 based on communication by the first antenna array 114 may be detected. In other words, a performance drop, such as a gain drop, a connectivity drop, a voice drop, a power output drop, or any sudden drops in performance may be attributed to the high heat generated. Such performance state may be used as a feedback to change the voltage input to one or more thermoelectric devices of the first plurality of thermoelectric devices 118 to cause desired cooling from the one or more thermoelectric devices to reduce fluctuation of temperature changes and maintain the temperature of the chips and circuitry associated with the first plurality of antenna elements 122 within the desired temperature range in order to optimize performance and prevent any potential loss of gain and other performance drops due to high temperatures.

In another implementation, the control of each of the first plurality of thermoelectric devices 118 may comprise substantially equalizing temperature associated with the first plurality of antenna elements 122 such that the performance state of the first plurality of antenna elements 122 of the first antenna array 114 is substantially equalized. There may be variation in power consumption of chips in the first antenna array 114, and as result there may be a difference in heat generation from the different chips. The processor 108 may be further configured to detect such variations based on a change in the performance state of such chips as compared to other chips of the first antenna array 114. By substantially equalizing the temperature associated with the first plurality of antenna elements 122, the performance of the first plurality of antenna elements 122 is substantially equalized. If the equalization is maintained within a range of about 0-10 percent difference, it can be considered as substantially equalizing as it does not generate any noticeable effect on performance. For example, by substantially equalizing the temperature associated with the first plurality of antenna elements 122, an equalization of gain across different regions of the first antenna array 114 may be achieved.

In an implementation, the first antenna array 114 may be a receiver antenna array, and thus by substantially equalizing the temperature associated with the first plurality of antenna elements 122, a distribution of gain may be further equalized across the first plurality of antenna elements 122 to achieve optimal power output from the received beam of input RF signals at different scan angles for the first antenna array 114. Moreover, by substantially equalizing the temperature associated with the first plurality of antenna elements 122, a desired transmit/receive power may be consistently maintained.

In accordance with an embodiment, the processor 108 may be further configured to obtain traffic information of a geographical area surrounding a deployed location of the communication apparatus 102. In such a case, the control of each of the first plurality of thermoelectric devices 118 further comprises increasing or decreasing cooling from each of the first plurality of thermoelectric devices 118 based on the obtained traffic information that indicates a number of user equipment (UEs) to be served in the geographical area. As the number of UEs to be serviced increases, the power consumption also increases at the first antenna array 114 to keep the first antenna array 114 functional to generate one or more beams. Thus, more voltage input may be supplied to some thermoelectric devices to provide more cooling to some chips covering corresponding subsets of antenna elements, where more cooling is required as per demand in such situations. The use of the traffic information as a parameter to decide the amount of cooling needed in advance prevents any unwanted deterioration of performance of the first antenna array 114.

In accordance with an embodiment, the processor 108 may be further configured to obtain in a real time or a near real time one or more of: a weather condition, a position information of one or more UEs to be served by the first antenna array 114, a two-dimensional (2D) or three-dimensional (3D) position information of the communication apparatus 102. In such a case, the control of each of the first plurality of thermoelectric devices 118 may further comprise increasing or decreasing cooling from each of the first plurality of thermoelectric devices 118 based on one or more of the obtained weather condition, the position information of one or more UEs to be served by the first antenna array 114, and the 2D or 3D position information of the communication apparatus 102. The communication apparatus 102 may be deployed outdoors, and thus may be subjected to extreme heat due to exposure to sunlight on a given day, which further increases the problem of heating during operation. Thus, in some implementations, the parameter of weather condition is also employed to decide how much cooling is needed to maintain a temperature of the first plurality of antenna elements 122 in the specified temperature range, for example, 20-30 degree Celsius. Moreover, the position of each of one or more UEs to be served by the first antenna array 114 with respect to the position of the communication apparatus 102 indicates a corresponding distance of the one or more UEs from the communication apparatus 102. Thus, a beam shape (i.e., a radiation pattern) used to serve a UE may have a specific need of power consumption and heating of certain antenna elements based on a direction of the beam to be transmitted to service the UE. Thus, circuitry and chips connected with such antenna elements may need more cooling, and thus more input voltage may be supplied to those thermoelectric devices that covers such antenna elements to generate more cooling as compared to other thermoelectric devices of the first plurality of thermoelectric devices 118.

In accordance with an embodiment, like the first antenna array 114, the processor 108 may be further configured to determine an operational state of the second plurality of antenna elements 124, and control each of the second plurality of thermoelectric devices 120 based on the determined operational state of the first plurality of antenna elements 122 as well as the second plurality of antenna elements 124.

In accordance with an embodiment, the first antenna array 114 may be a service side antenna array that faces a plurality of UEs and the second antenna array 116 may be a source side antenna array that faces one or more base stations. In such a case, the second plurality of thermoelectric devices 120 may be less than the first plurality of thermoelectric devices 118. In a case where the position of communication apparatus 102 with respect to the base station do not change, it can be derived that there will be comparatively less changes in beamforming resulting in less power consumption and heat generation at the source side antenna array as compared to the service side antenna array. This results in lower cooling needs at the source side antenna array as compared to the service side antenna array. Thus, in such cases, the second plurality of thermoelectric devices 120 may be less than the first plurality of thermoelectric devices 118. In accordance with another embodiment, both the first antenna array 114 and the second antenna array 116 may be service side antenna arrays that faces a plurality of UEs or another communication apparatus 102. In such a case, the second plurality of thermoelectric devices 120 may be equal to the first plurality of thermoelectric devices 118.

In an exemplary implementation, the communication apparatus 102 may be installed in a vehicle as a repeater device. The first antenna array 114 and the second antenna array 116 may be mounted at different locations of the vehicle. In such a case, one of the first antenna array 114 and the second antenna array 116 may be configured to be activated or deactivated based on a visibility status to a network node, such as a base station or a roadside unit, when the vehicle in in motion. In such a case, the processor 108 may be further configured to control activation or a deactivation of each of the first plurality of thermoelectric devices 118 and the second plurality of thermoelectric devices 120 in accordance with the activation or deactivation of the first antenna array 114 or the second antenna array 116 based on the visibility status.

For the sake of brevity, the aforementioned implementations (and embodiments) are described with two antenna arrays in the communication apparatus 102. However, it is to be understood by a person of ordinary skill in the art that such implementations and embodiments can be extended to cover cases of N antenna arrays and M thermoelectric devices, without limiting the scope of the disclosure.

Figure 2:
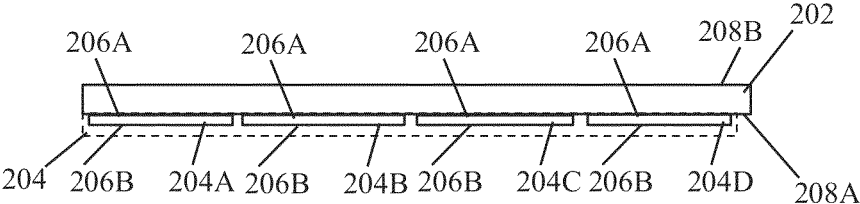
FIG. 2 is an illustration of an arrangement of a plurality of thermoelectric devices on an antenna array, in accordance with an embodiment of the disclosure.

FIG. 2 is an illustration of an arrangement of a plurality of thermoelectric devices on an antenna array, in accordance with an embodiment of the disclosure. FIG. 2 is explained in conjunction with elements from FIG. 1. With reference to FIG. 2, there is shown an antenna array 202 and a plurality of thermoelectric devices, such as a first thermoelectric device 204A, a second thermoelectric device 204B, a third thermoelectric device 204C, and a fourth thermoelectric device 204D.

In this embodiment, the antenna array 202 corresponds to the first antenna array 114 and the second antenna array 116. Similarly, the plurality of thermoelectric devices 204 corresponds to the first plurality of thermoelectric devices 118 and the second plurality of thermoelectric devices 120. In FIG. 2, each of the plurality of thermoelectric devices has a cooling side 206A and a heat dissipation side 206B, as shown. The antenna array 202 has a first side 208A that represents a radio frequency (RF) circuitry and chip side and a second side 208B that represents a radiating side of a plurality of antenna elements of the antenna array 202. The cooling side 206A each of the plurality of thermoelectric devices is arranged on the first side 208A of the antenna array. The plurality of thermoelectric devices 204 may be arranged on the plurality of antenna elements of the antenna array 202 such that each thermoelectric device covers a different subset of antenna elements of the plurality of antenna elements of the antenna array 202.

Figure 3:
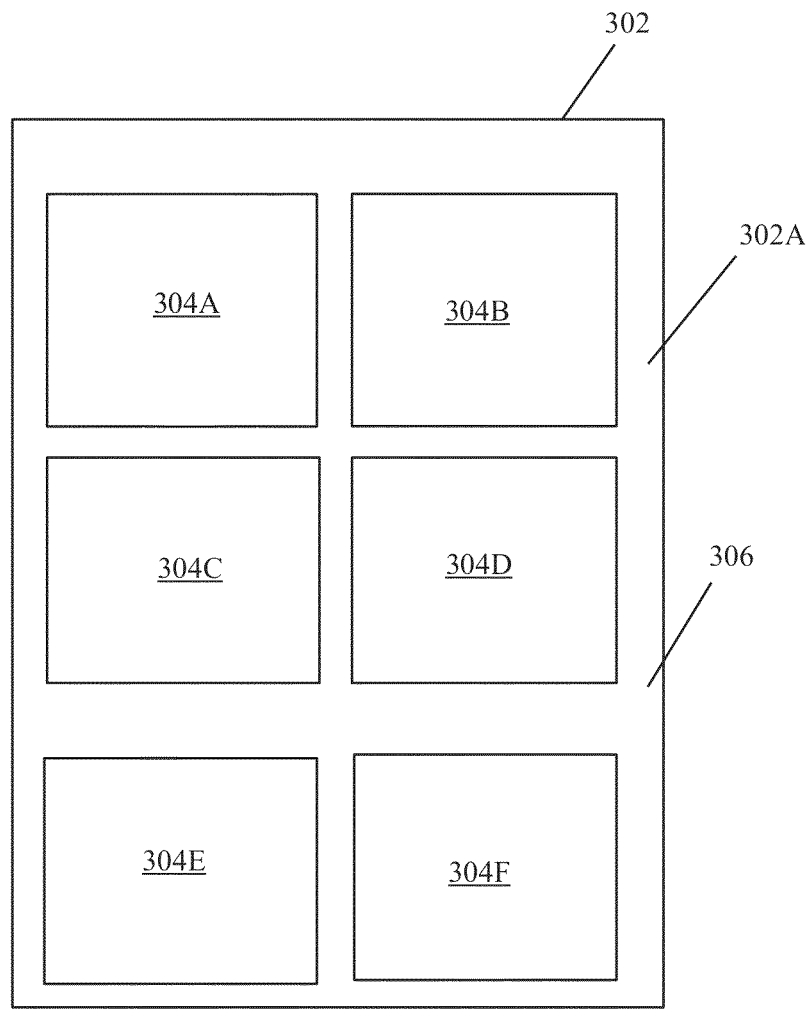
FIG. 3 is an illustration of an arrangement of a plurality of thermoelectric devices on an antenna array, in accordance with another embodiment of the disclosure.

FIG. 3 is an illustration of an arrangement of a plurality of thermoelectric devices on an antenna array, in accordance with another embodiment of the disclosure. FIG. 3 is explained in conjunction with elements from FIGS. 1 and 2. With reference to FIG. 3, there is shown an antenna array 302 and a plurality of thermoelectric devices 304A, 304B, 304C, 304D, 304E, and 304F. There is further shown a motherboard 306 that supports a plurality of chips arranged on the first side 302A of the antenna array 302 and connected with different antenna elements of a plurality of antenna elements of the antenna array 302 that radiates from a second side that is opposite to the first side 302A.

In accordance with an embodiment, the cooling side of the plurality of thermoelectric devices 304A, 304B, 304C, 304D, 304E, and 304F may be arranged on the antenna array 302 such that each thermoelectric device covers a different subset of antenna elements (i.e., covers one or more chips associated with each subset of antenna elements) of the antenna array 302 from the first side 302A (i.e. the chips and circuitry side). It is to be understood by one of ordinary skill in the art that selection of number and size of the thermoelectric device may depend on its application or requirement, without limiting the scope of the disclosure. For example, in an exemplary implementation, one thermoelectric device may cover four chips. In another implementation, one thermoelectric device may cover 8-10 Tx/Rx chips including mixer chips. In yet another implementation, only two or four thermoelectric devices may be used to cover one antenna array.

Figure 4C:
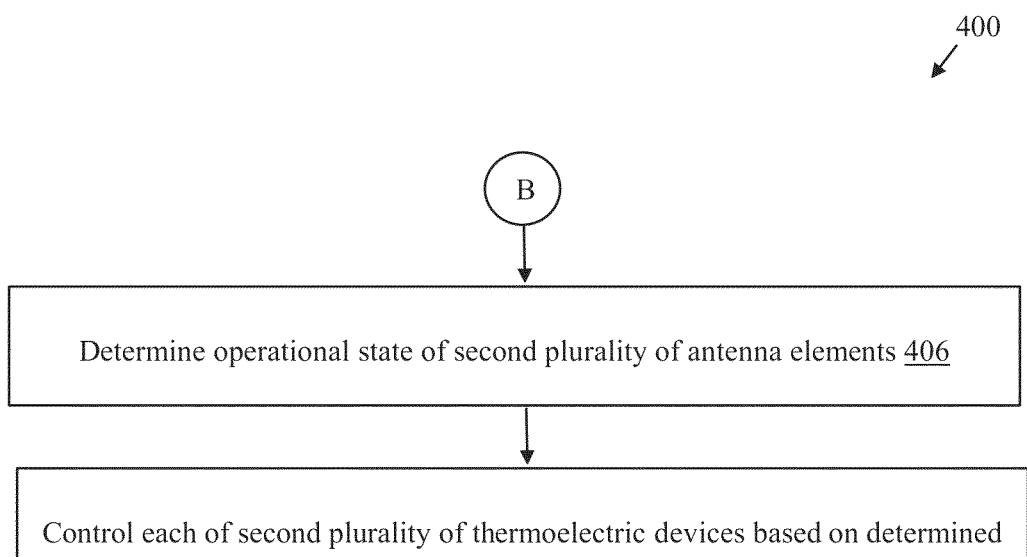

FIGS. 4A, 4B, and 4C collectively is a flowchart that illustrates a method for adaptive cooling of antenna elements, in accordance with an embodiment of the disclosure. FIGS. 4A, 4B, and 4C are explained in conjunction with elements from FIGS. 1 to 3. With reference to FIGS. 4A to 4C, there is shown a flowchart 400 comprising exemplary operations 402 through 408. The operations of the method depicted in the flowchart 400 may be implemented in the communication apparatus 102 (FIG. 1).

At 402, an operational state of the first plurality of antenna elements 122 may be determined. The determination of the operational state of the first plurality of antenna elements 122 devices may further comprise one or more sub-operations corresponding to operations 402A and 402F.

At 402A, it may be determined which antenna elements of the first plurality of antenna elements 122 are in an activated state and which are in a deactivated state. At 402B, a performance state of the first plurality of antenna elements 122 of the first antenna array 114, may be determined. At 402C, traffic information may be obtained of a geographical area surrounding a deployed location of the communication apparatus. At 402D, an operational state of the first plurality of antenna elements 122 may be proactively predicted based on the obtained traffic information. At 402E, it may be obtained in a real time or a near real time one or more of: a weather condition, a position information of one or more UEs to be served by the first antenna array 114, a two-dimensional (2D) or three-dimensional (3D) position information of the communication apparatus 102. At 402F, an operational state of the first plurality of antenna elements 122 may be proactively predicted based on the obtained weather condition, the position information of one or more UEs to be served by the first antenna array 114, and the 2D or 3D position information of the communication apparatus 102.

At 404, each of the first plurality of thermoelectric devices 118 may be controlled based on the determined operational state of the first plurality of antenna elements 122 such that an adaptive cooling is applied on different subsets of antenna elements of the first plurality of antenna elements 122 to maintain a temperature of the first plurality of antenna elements 122 in a specified temperature range. The control of each of the first plurality of thermoelectric devices 118 further comprises one or more sub-operations corresponding to operations 404A to 404E.

At 404A, an activation or a deactivation of each of first plurality of thermoelectric devices may be executed in synchronization with the activated state or deactivated state of the different subsets of antenna elements of the first plurality of antenna elements 122. At 404B, a voltage input may be changed to cause a corresponding change in a temperature of the first plurality of thermoelectric devices 118 such that the adaptive cooling is applied on different subsets of antenna elements of the first plurality of antenna elements 122. At 404C, temperature associated with the first plurality of antenna elements 122 may be substantially equalized such that the performance state of the first plurality of antenna elements 122 of the first antenna array 114 is also substantially equalized. At 404D, cooling from each of the first plurality of thermoelectric devices 118 may be increased or decreased based on the obtained traffic information that indicates a number of user equipment (UEs) to be served in the geographical area. At 404E, cooling from each of the first plurality of thermoelectric devices 118 may be increased or decreased based on one or more of: the obtained weather condition, the position information of one or more UEs to be served by the first antenna array 114, and the 2D or 3D position information of the communication apparatus 102.

At 406, an operational state of the second plurality of antenna elements 124 may be determined. At 408, each of the second plurality of thermoelectric devices 120 may be controlled based on the determined operational state of the first plurality of antenna elements 122 as well as the second plurality of antenna elements 124.

It is known that conventional approach of using heatsinks and/or fans for cooling existing communication apparatus, such as a repeater device, may result in bulky modules which make it impractical to use servo-driven antenna arrays for optimum performance. To alleviate the problem, the intelligent use of the thermoelectric devices for adaptive cooling based on operational state of antenna elements of a given antenna array improves the reliability of communication, such as mmWave communication, to meet data communication in multi-gigabit data rate, by significantly reducing performance breakdowns due to heating of chips and driver circuits associated with such antenna elements. The use of the thermoelectric devices for adaptive cooling based on operational state of antenna elements results in a temperature difference of up to, for example, 25 degree Celsius approximately.

Various embodiments of the disclosure may provide a non-transitory computer-readable medium having stored thereon, computer implemented instructions that when executed by a computer causes a communication apparatus 102 to execute operations, the operations comprising determining an operational state of the first plurality of antenna elements 122 of the first antenna array 114; and controlling each of the first plurality of thermoelectric devices 118 based on the determined operational state of the first plurality of antenna elements 122 such that an adaptive cooling is applied on different subsets of antenna elements of the first plurality of antenna elements 122 to maintain a temperature of the first plurality of antenna elements 122 in a specified temperature range.

Various embodiments of the disclosure may include a communication apparatus 102, for example, a repeater device, a small cell, or an edge repeater device. The communication apparatus 102 comprises the first antenna array 114 that comprises a first plurality of antenna elements 122. The communication apparatus 102 further comprises the first plurality of thermoelectric devices 118 that may be arranged on the first plurality of antenna elements 122 of the first antenna array 114 such that each thermoelectric device covers a different subset of antenna elements of the first plurality of antenna elements 122. The communication apparatus 102 further comprises a processor 108 communicatively coupled to the first antenna array 114 and the first plurality of thermoelectric devices 118, wherein the processor 108 may be configured to: determine an operational state of the first plurality of antenna elements 122; and control each of the first plurality of thermoelectric devices 118 based on the determined operational state of the first plurality of antenna elements 122 such that an adaptive cooling may be applied on different subsets of antenna elements of the first plurality of antenna elements 122 to maintain a temperature of the first plurality of antenna elements 122 in a specified temperature range.

In accordance with an embodiment, each of the thermoelectric devices has the cooling side 206A and the heat dissipation side 206B, and wherein the first antenna array 114 has the first side 208A that represents a radio frequency (RF) circuitry and chip side and the second side 208B that represents a radiating side of the first plurality of antenna elements 122, and wherein the cooling side 206A each of the thermoelectric device may be arranged on the first side 208A of the first antenna array 114.

In accordance with an embodiment, the determination of the operational state of the first plurality of antenna elements 122 comprises determining which antenna elements of the first plurality of antenna elements 122 may be in an activated state and which may be in a deactivated state. The control of each of the first plurality of thermoelectric devices 118 comprises executing an activation or a deactivation of each of first plurality of thermoelectric devices in synchronization with the activated state or deactivated state of the different subsets of antenna elements of the first plurality of antenna elements 122.

In accordance with an embodiment, the determination of the operational state of the first plurality of antenna elements 122 comprises determining a performance state of the first plurality of antenna elements 122 of the first antenna array 114. The control of each of the first plurality of thermoelectric devices 118 comprises changing a voltage input to cause a corresponding change in a temperature output from each of the first plurality of thermoelectric devices 118 such that the adaptive cooling may be applied on different subsets of antenna elements of the first plurality of antenna elements 122. In accordance with an embodiment, the control of each of the first plurality of thermoelectric devices 118 comprises substantially equalizing temperature associated with the first plurality of antenna elements 122 such that the performance state of the first plurality of antenna elements 122 of the first antenna array 114 may be substantially equalized.

In accordance with an embodiment, the processor 108 may be further configured to obtain traffic information of a geographical area surrounding a deployed location of the communication apparatus. The control of each of the first plurality of thermoelectric devices 118 further comprises increasing or decreasing cooling from each of the first plurality of thermoelectric devices 118 based on the obtained traffic information that indicates a number of user equipment (UEs) to be served in the geographical area.

In accordance with an embodiment, the processor 108 may be further configured to obtain in a real time or a near real time one or more of a weather condition, a position information of one or more UEs to be served by the first antenna array 114, a two-dimensional (2D) or three-dimensional (3D) position information of the communication apparatus 102. The control of each of the first plurality of thermoelectric devices 118 further comprises increasing or decreasing cooling from each of the first plurality of thermoelectric devices 118 based on one or more of the obtained weather condition, the position information of one or more UEs to be served by the first antenna array 114, and the 2D or 3D position information of the communication apparatus 102.

In accordance with an embodiment, the communication apparatus 102 further comprises the second antenna array 116 that comprises the second plurality of antenna elements 124. The communication apparatus 102 further comprises the second plurality of thermoelectric devices 120 that may be arranged on the second plurality of antenna elements 124 of the second antenna array 116 such that each thermoelectric device covers a different subset of antenna elements of the second plurality of antenna elements 124. The processor 108 may be communicatively coupled to the second antenna array 116 and the second plurality of thermoelectric devices 120. The processor 108 may be further configured to determine an operational state of the second plurality of antenna elements 124, and control each of the second plurality of thermoelectric devices 120 based on the determined operational state of the first plurality of antenna elements 122 as well as the second plurality of antenna elements 124.

In accordance with an embodiment, the first antenna array 114 may be a service side antenna array that faces a plurality of UEs and the second antenna array 116 may be a source side antenna array that faces one or more base stations, where the second plurality of thermoelectric devices 120 may be less than the first plurality of thermoelectric devices 118. In accordance with another embodiment, both the first antenna array 114 and the second antenna array 116 may be service side antenna arrays that faces a plurality of UEs or another communication apparatus, wherein the second plurality of thermoelectric devices 120 may be equal to the first plurality of thermoelectric devices 118.

In accordance with an embodiment, the communication apparatus 102 may be one of: an XG-enabled repeater device, an XG-enabled small cell, or an XG-enabled customer premise equipment (CPE), and wherein the first antenna array 114 and the second antenna array 116 may be one of: an XG phased-array antenna panel, an XG-enabled antenna chipset, an XG-enabled patch antenna array, and wherein the XG refers to 5G or 6G.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor 108, processor 108 core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods described herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor 108 core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A communication apparatus, comprising:
a first antenna array comprising a first plurality of antenna elements mounted at a first location on a vehicle;
a first plurality of thermoelectric devices arranged on the first plurality of antenna elements of the first antenna array such that each thermoelectric device covers a different subset of antenna elements of the first plurality of antenna elements; and
a processor communicatively coupled to the first antenna array and the first plurality of thermoelectric devices, wherein the processor is configured to:
determine a visibility status of the first antenna array to a network node when the vehicle is in motion;
activate or deactivate the first antenna array based on the visibility status of the first antenna array; and
control each of the first plurality of thermoelectric devices based on the activation of the first antenna array or the deactivation of the first antenna array.

2. The communication apparatus according to claim 1, wherein the communication apparatus is installed in the vehicle as a repeater device, and the network node is one of a base station or a roadside unit.

3. The communication apparatus according to claim 1, further comprising:
a second antenna array comprising a second plurality of antenna elements mounted at a different location on the vehicle than the first antenna array; and a second plurality of thermoelectric devices arranged on the second plurality of antenna elements of the second antenna array, wherein the processor is further configured to:

determine a visibility status of the second antenna array to the network node when the vehicle is in the motion;

activate or deactivate the second antenna array based on the visibility status of the second antenna array; and control each of the second plurality of thermoelectric devices based on the activation of the second antenna array or the deactivation of the second antenna array.

4. The communication apparatus according to claim 1, wherein the first antenna array is configured as a source side antenna array that faces one or more base stations, and a number of thermoelectric devices on the first antenna array is higher than a number of thermoelectric devices on a service side antenna array that faces at least one User Equipment.

5. The communication apparatus according to claim 1, wherein the first antenna array is configured to face an interior of the vehicle, and a number of thermoelectric devices on the first antenna array is less than a number of thermoelectric devices on a service side antenna array that faces at least one User Equipment.

6. The communication apparatus according to claim 1, wherein each of the first plurality of thermoelectric devices has a cooling side and a heat dissipation side, the first antenna array has a first side that represents a radio frequency (RF) circuitry and chip side and a second side that represents a radiating side of the first plurality of antenna elements, and the cooling side each of the first plurality of thermoelectric devices is arranged on the first side of the first antenna array.

7. The communication apparatus according to claim 3, wherein the control of each of the first plurality of thermoelectric devices comprises executing an activation or a deactivation of each of first plurality of thermoelectric devices in synchronization with the activation or the deactivation of the first antenna array.

8. The communication apparatus according to claim 1, wherein the control of each of the first plurality of thermoelectric devices comprises changing a voltage input to cause a corresponding change in a temperature of a corresponding thermoelectric device of the first plurality of thermoelectric devices such that an adaptive cooling is applied on a subset of the first plurality of antenna elements of the first antenna array.

9. The communication apparatus according to claim 1, wherein the control of each of the first plurality of thermoelectric devices comprises equalizing a temperature associated with the first plurality of antenna elements such that a performance state of the first plurality of antenna elements of the first antenna array is equalized.

10. The communication apparatus according to claim 1, wherein the processor is further configured to obtain in a real time or a near real time one or more of: a weather condition, a position information of one or more User Equipment (UEs) to be served by the first antenna array, a two-dimensional (2D) or three-dimensional (3D) position information of the communication apparatus.

11. The communication apparatus according to claim 10, wherein the control of each of the first plurality of thermoelectric devices further comprises increasing or decreasing cooling from each of the first plurality of thermoelectric devices based on one or more of: the obtained weather condition, the position information of one or more UEs to be served by the first antenna array, and the 2D or 3D position information of the communication apparatus.

12. A method, comprising:

in a communication apparatus installed in a vehicle and comprising a first antenna array:

determining a visibility status of the first antenna array to a network node when the vehicle is in motion, wherein the first antenna array comprises a first plurality of antenna elements mounted at a first location on the vehicle, and a first plurality of thermoelectric devices is arranged on the first plurality of antenna elements of the first antenna array such that each thermoelectric device of the first plurality of thermoelectric devices covers a different subset of antenna elements of the first plurality of antenna elements;

activating or deactivating the first antenna array based on the visibility status of the first antenna array; and controlling each of the first plurality of thermoelectric devices based on the activation of the first antenna array or the deactivation of the first antenna array.

13. The method according to claim 12, wherein the communication apparatus is installed in the vehicle as a repeater device, and the network node is one of a base station or a roadside unit.

14. The method according to claim 12, further comprising:

determining a visibility status of a second antenna array to the network node when the vehicle is in the motion, wherein the communication apparatus comprises the second antenna array, the second antenna array comprises a second plurality of antenna elements mounted at a different location on the vehicle than the first antenna array, and a second plurality of thermoelectric devices are arranged on the second plurality of antenna elements of the second antenna array;

activating or deactivating the second antenna array based on the visibility status of the second antenna array; and controlling each of the second plurality of thermoelectric devices based on the activation of the second antenna array or the deactivation of the second antenna array.

15. The method according to claim 12, wherein the first antenna array is configured as a source side antenna array that faces one or more base stations, and a number of thermoelectric devices on the first antenna array is higher than a number of thermoelectric devices on a service side antenna array that faces at least one User Equipment.

16. The method according to claim 12, wherein the controlling of each of the first plurality of thermoelectric devices comprises executing an activation or a deactivation of each of first plurality of thermoelectric devices in synchronization with the activation or the deactivation of the first antenna array.

17. The method according to claim 12, wherein the controlling of each of the first plurality of thermoelectric devices comprises changing a voltage input to cause a corresponding change in a temperature of a corresponding thermoelectric device of the first plurality of thermoelectric devices such that an adaptive cooling is applied on a subset of the first plurality of antenna elements of the first antenna array.

18. The method according to claim 12, wherein the controlling of each of the first plurality of thermoelectric devices comprises equalizing a temperature associated with the first plurality of antenna elements such that a performance state of the first plurality of antenna elements of the first antenna array is equalized.

19. The method according to claim 12, further comprising obtaining in a real time or a near real time one or more of: a weather condition, a position information of one or more User Equipment (UEs) to be served by the first antenna array, a two-dimensional (2D) or three-dimensional (3D) position information of the communication apparatus.

20. The method according to claim 19, wherein the controlling of each of the first plurality of thermoelectric devices further comprises increasing or decreasing cooling from each of the first plurality of thermoelectric devices based on one or more of: the obtained weather condition, the position information of one or more UEs to be served by the first antenna array, and the 2D or 3D position information of the communication apparatus.

\* \* \* \* \*